United States Patent [19]

Stark

[11] Patent Number: 5,625,266
[45] Date of Patent: Apr. 29, 1997

[54] SLIDING DOOR WITH A DRIVE MOTOR SYSTEM AND CONTROL AND REGULATION FOR A DOOR DRIVEN BY AN ELECTROMECHANICAL MOTOR

[75] Inventor: Jürgen Stark, Hattingen, Germany

[73] Assignee: DORMA GmbH & Co. KG, Ennepetal, Germany

[21] Appl. No.: 527,823

[22] Filed: Jul. 28, 1995

Related U.S. Application Data

[63] Continuation-in-part of PCT/DE94/01316 Nov. 2, 1994.

[30] Foreign Application Priority Data

Nov. 30, 1993 [DE] Germany ............... 43 40 715.2

[51] Int. Cl.$^6$ ........................................ E05F 15/20
[52] U.S. Cl. ..................... 318/466; 318/283; 318/603; 187/316; 49/31
[58] Field of Search .................... 318/280–283, 318/600–696, 102; 187/290–320; 49/118, 120, 360

[56] References Cited

U.S. PATENT DOCUMENTS

| | | | |
|---|---|---|---|
| 4,449,078 | 5/1984 | Ogishi et al. | 318/102 |
| 4,563,625 | 1/1986 | Kornbrekke et al. | 318/603 |
| 5,127,190 | 7/1992 | Hein et al. | |
| 5,234,512 | 8/1993 | Inoue et al. | |
| 5,495,918 | 3/1996 | Peruggi et al. | 187/316 |
| 5,509,504 | 4/1996 | McHugh et al. | 187/316 |

FOREIGN PATENT DOCUMENTS

| | | |
|---|---|---|
| 0192157 | 8/1986 | European Pat. Off. |
| 0264350 | 4/1988 | European Pat. Off. |
| 0457861 | 11/1991 | European Pat. Off. |
| 3940762 | 6/1991 | Germany |
| 4134396 | 5/1992 | Germany |
| 4207705 | 4/1993 | Germany |
| 9318444 | 9/1993 | WIPO |

*Primary Examiner*—Paul Ip
*Attorney, Agent, or Firm*—Nils H. Ljungman and Associates

[57] ABSTRACT

An electromechanically operated door having a control and regulation system for the door, the door for being driven by an electric motor, the movement of the door being controlled by sensors. The control and regulation system is equipped with a microprocessor control. In addition to the normal path of data to the microprocessor control, a dual redundancy is achieved, in that there is a safety monitoring system which receives the same safety-related information as the microprocessor control. This safety monitoring system, for its part, is capable of detecting a fault, i.e. if the microprocessor control system has not shut off the door, the door is shut off by the safety monitoring system, which for its part reports any faults which occur in the system to a fault detection unit, and here again, by means of a redundant shutdown unit, brings the connected motor and thus the door to an immediate stop. In addition to the automatic verification of the safety-related functions, manual verification of the safety functions is also possible. Also contemplated is a control and regulation system, having the above features, for a door.

20 Claims, 6 Drawing Sheets

SLIDING DOOR WITH A DRIVE MOTOR SYSTEM AND CONTROL AND REGULATION FOR A DOOR DRIVEN BY AN ELECTROMECHANICAL MOTOR

CONTINUING APPLICATION DATA

The present invention is a continuation-in-part of International Patent Application No. PCT/DE94/01316, having publication number WO 95/15517, published on Jun. 8, 1995, in which the United States of America was a designated state as of the filing of the Patent Application. International Application No. PCT/DE94/01316 was pending as of the filing date of this application.

BACKGROUND OF THE INVENTION

1. Field of the Invention

The present invention generally relates to a door having a control and regulation system, the door being driven by an electromechanical motor, the movement of the door being controlled by sensors, whereby the control and regulation unit contains a microprocessor provided for signal and command processing.

The present invention also generally relates to a control and regulation system for a door driven by an electromechanical motor, the movement of the door being controlled by sensors, whereby the control and regulation unit contains a microprocessor provided for signal and command processing.

2. Background of the Invention

There exist various types of automatic doors, such as revolving doors, swinging doors, curved panel doors, folding doors, etc., all of which are operated by an electric motor. To control and regulate the door, a unit, which is equipped with a microprocessor, can be used. The microprocessor controls and regulates the operation of the door connected to it, on the basis of stored programs and in connection with external sensors or other safety devices.

A known swinging door is described in Unexamined German Patent Application 39 40 762. This publication discloses a door safety module in which the safety-related functions of the door are combined and processed.

A revolving door which is controlled and regulated by means of a multitasking system is disclosed in German Patent No. 42 07 705. Essentially all the functions of the door, including the control system and the microprocessor, are monitored internally in a data processing unit.

However, of all the controls and systems available in the market, none is able to make a dual contribution to safety by means of a separate arrangement which is independent of the microprocessor used, and by means of the control and regulation system used.

OBJECT OF THE INVENTION

The object of the present invention is to create an increased level of safety for an automatically operated door controlled or regulated by means of a microprocessor, but in which it is possible to make manual interventions or perform verifications.

SUMMARY OF THE INVENTION

The present invention teaches that the above object can be accomplished, in accordance with at least one preferred embodiment, by an arrangement in which the safety-related information and data, in addition to the processing in the microprocessor control system are also transported to an additional safety monitoring system, where they are processed, and the output signal of the safety monitoring system is transported to a fault alarm unit which by means of direct action on the motor brings the motor to a stop, in addition to the direct actuation by the microprocessor control, and by the fact that a service unit is connected to the microprocessor control system.

In addition to the standard processing of the input signals by a microprocessor, the safety-related signals which can come from sensors or switches are also preferably transported to a safety monitoring system. In the safety monitoring system, decisions are made on the basis of specified criteria as to whether there is a fault or failure in the system, and whether this fault is sufficiently serious to require stopping the door. If there is a safety-related fault or failure, the error is preferably reported to a fault alarm unit, which, for its part, is responsible for guaranteeing that the motor of the door which is connected comes to an immediate stop. A quasi-redundant or double-channel system is thereby essentially created, in which the same signal is also processed in the microprocessor. As a result of the double redundancy or double-channel arrangement, it can be guaranteed that, in the event of the failure of one of the safety paths, whether the path through the microprocessor or the path through the safety monitoring system, the connected door can be stopped in any case, and thus injuries to the people using the door can be prevented.

The present invention also teaches that an additional step can be taken to increase safety, namely the connection of a "watch dog" timer which is not located inside the microprocessor, but outside. However, this watch dog timer is preferably triggered by the microprocessor, so that, in the event of the failure of the microprocessor, the connected system is also brought to a stop. The door system can essentially only be restarted if a manual reset-start is performed after the safety monitoring system has intervened.

By means of a service unit which is connected to the microprocessor control system, service personnel are able to verify the entire system and all its safety-related functions. This verification can be carried out, for example, by means of manual switches. By actuating a switch, a fixed signal can be applied, and a program sequence can prevent the door from braking when it receives a stop signal from the sensor system. For example, the braking of the door in response to a potential stop signal from the sensor system can be prevented, so that the safety monitoring system can perform this task itself for test purposes.

All the faults and malfunctions which occur are preferably displayed either in a separate fault display unit or in a fault alarm report from the safety monitoring system. The fault alarm can be reported acoustically, displayed optically, or both.

It is to be understood that the terms "double redundant" and "double-channel", as utilized herein, may, in accordance with at least one preferred embodiment of the present invention, be considered to be interchangeable.

In summary, one aspect of the invention resides broadly in an electromechanically operated door having a control and regulation system for the door, the door for being driven by an electric motor, and the movement of the door for being controlled by sensors, whereby the control and regulation unit contains a microprocessor provided for signal and command processing, wherein the safety-related information and data, in addition to the processing in the microprocessor control system are also transported to an additional safety monitoring system, where they are processed, and the output signal of the safety monitoring system is transported to a fault alarm unit, which by means of direct action on the motor, brings the motor to a stop, in addition to the direct actuation by the microprocessor control, and by the fact that a service unit is connected to the microprocessor control system.

The above discussed embodiments of the present invention will be described further hereinbelow with reference to the accompanying figures. When the word "invention" is used in this specification, the word "invention" includes "inventions" that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to embodiments illustrated in the accompanying drawings, wherein.

DESCRIPTION OF THE PREFERRED EMBODIMENT

Figure 1:
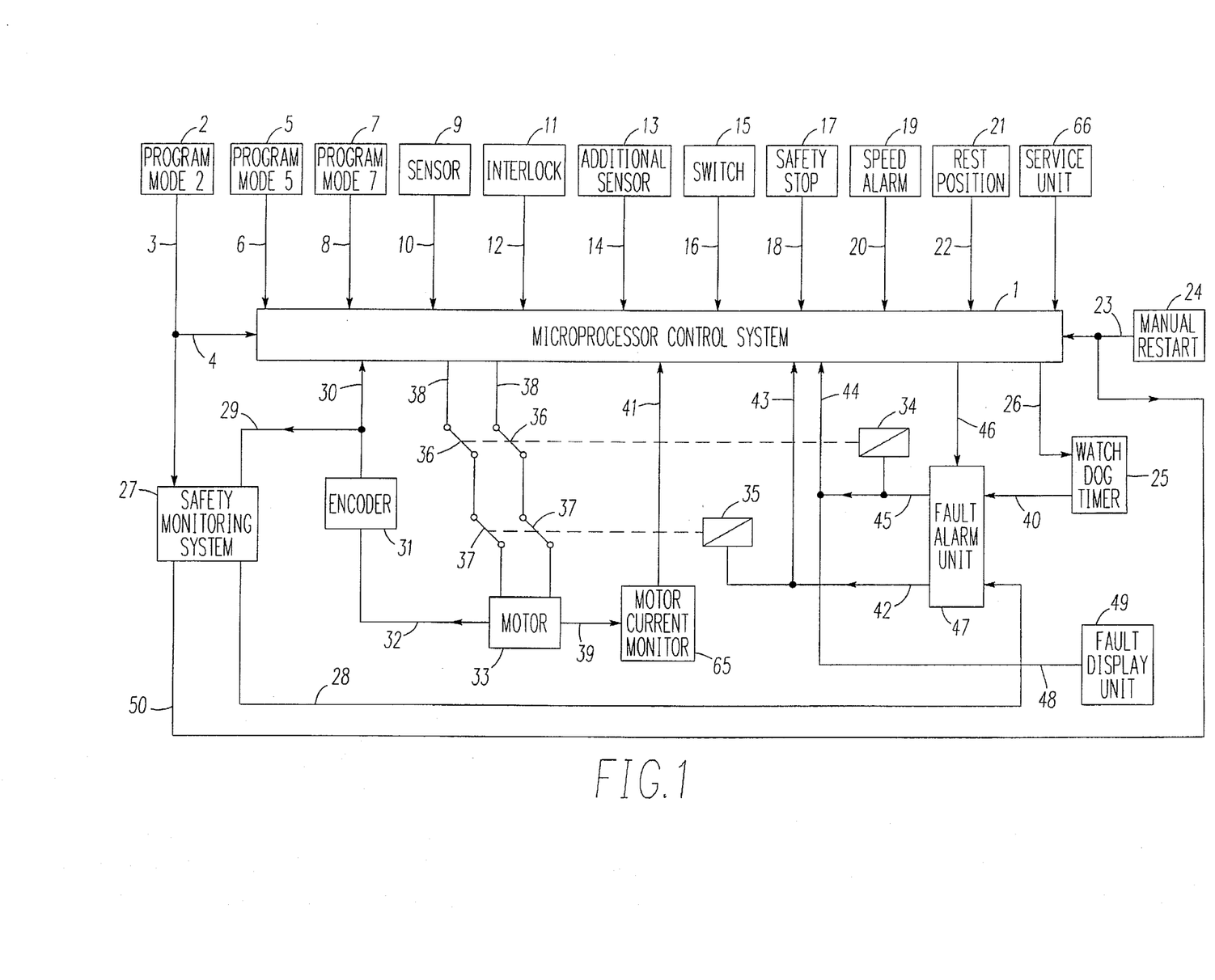
FIG. 1 is a schematic diagram of the circuitry of a control and regulation system equipped with redundant safety measures.
Figure 1A:
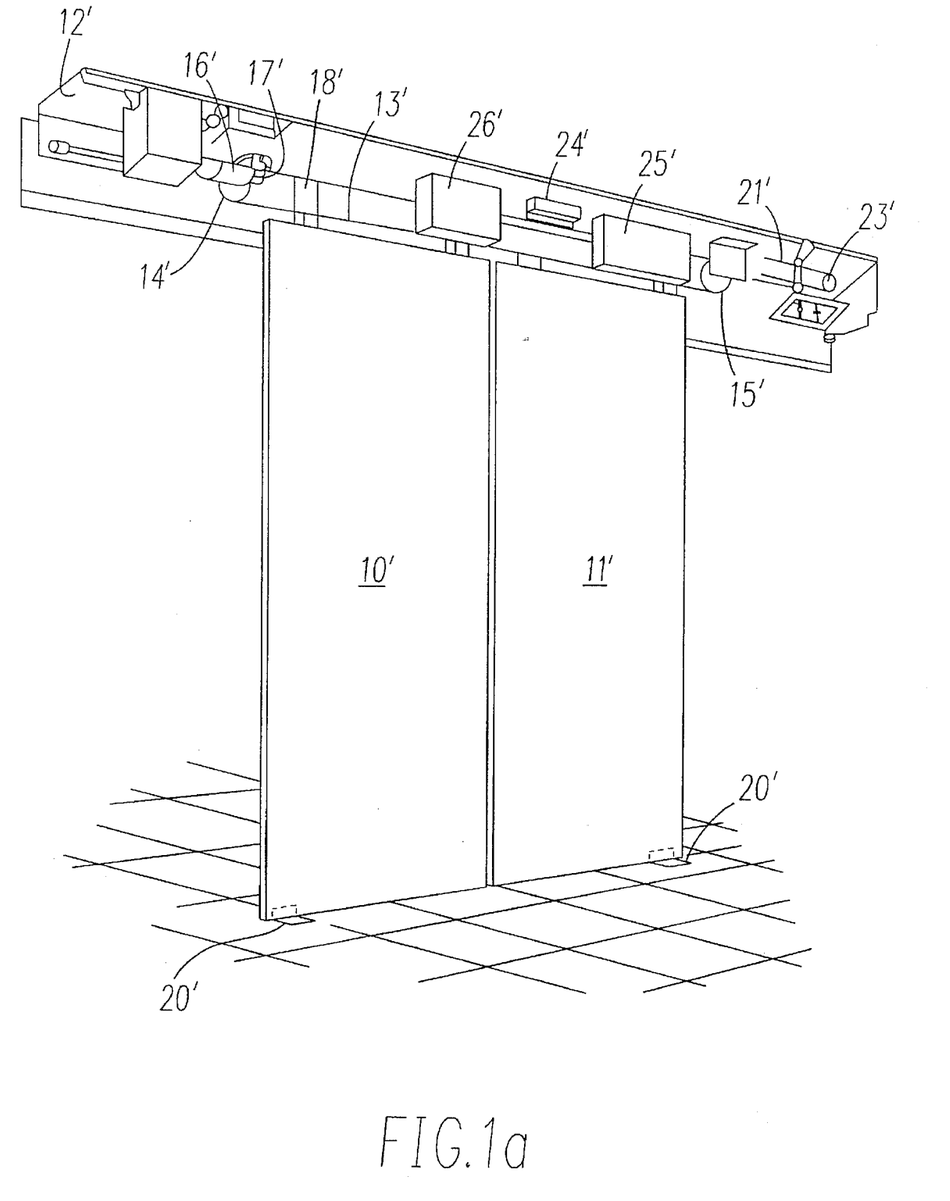
FIG. 1a is a perspective view of a door with door controls and a door-safety module.
Figure 1B:
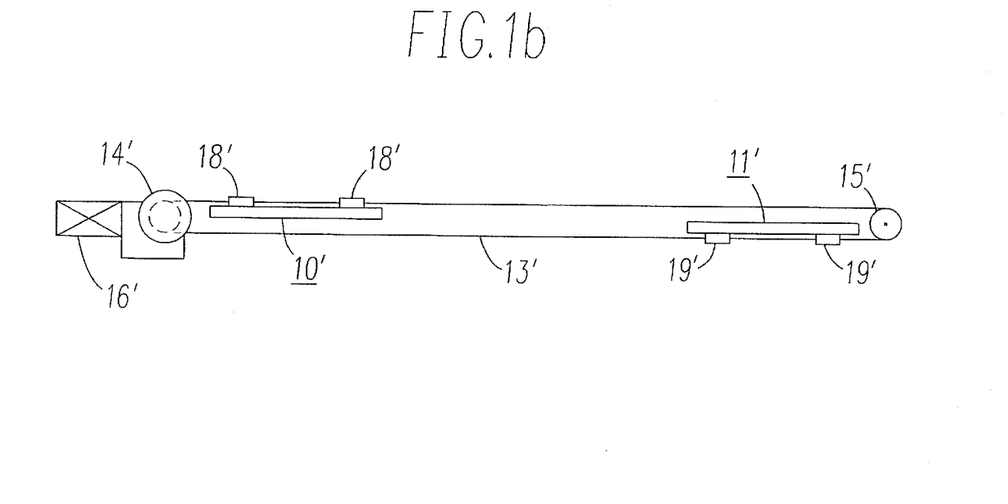
FIG. 1b is a schematic representation of a motorized mechanism that can drive a door panel.
Figure 1C:
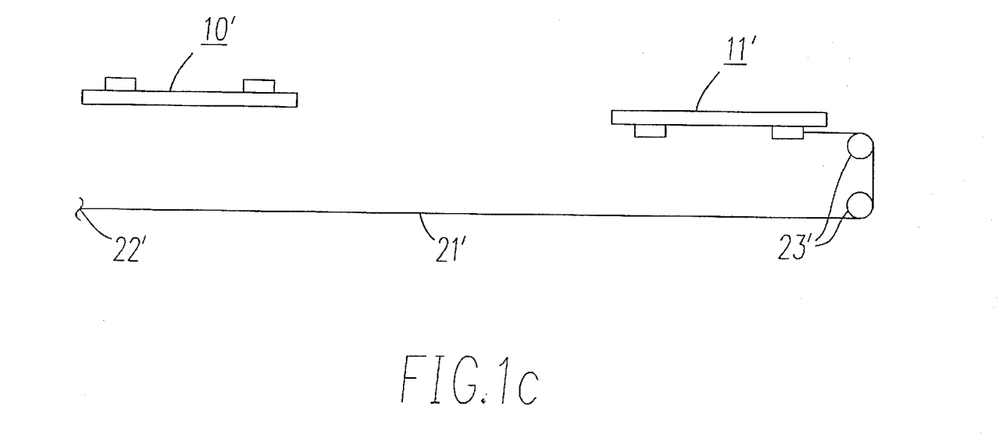
FIG. 1c is a schematic representation of an auxiliary drive mechanism associated with a door panel operated by that mechanism and connected to another door panel by a motorized drive stage illustrated in FIG. 1b.

FIGS. 1a–1c illustrate a conventional sliding door, and associated mechanisms, that may be utilized in accordance with the embodiments of the present invention.

As shown in FIGS. 1a and 1b, panels 10' and 11' of a two-paneled sliding door can, in a known manner, be mounted on rollers on a track that is part of a springer 12'. The carrier, in which the rollers are mounted, can also have backing rollers to prevent the panels from coming loose.

The illustrated embodiment of panels 10' and 11' can typically be activated by a drive mechanism 13', which can, for example, be a continuous toothed belt with one end travelling around a cogwheel 14' and the other around a pulley 15' secured to springer 12'. Cogwheel 14' can typically be connected to a motor 16' with a transmission by way of an electromagnetic clutch 17' in such a way as to transmit torque. Panel 10' can be secured to one strand of belt drive 13' in a known manner, for example by brackets 18', and panel 11' can be secured to the other strand by brackets 19', ensuring that the panels (10', 11') will slide in opposite directions when the belt drive 13' is activated. Panels 10' and 11' can be secured to the floor in a known manner, with known floor slides 20'.

In addition to the main drive mechanism just described, illustrated in FIG. 1b and comprising a continuous belt drive 13', the door panels can also be operated with an auxiliary drive mechanism. This mechanism can typically consist essentially of a resilient structure 21' with one end engaging one of the panels (11', for example) and the other end secured to a stationary point 22' on springer 12'. When the panel is shifted into its closed position by motor 16', resilient structure 21', which travels around pulleys 23', is tensioned and accumulates potential energy when panels 10' and 11' are together. When, accordingly, the door is closed and electromagnetic clutch 17' is deprived of current, the tension in resilient structure 21' will force panels 10' and 11' into the open position illustrated in FIGS. 1b and 1c. Since both panels are connected by belt drive 13', panel 10' will essentially move along with the panel 11' that is directly subjected to resilient structure 21'. The two panels (10', 11') can be secured together, when closed, by a known type of locking mechanism 24'.

The motion of panels 10' and 11' can typically be regulated with regular controls 25' electrically connected to a door-safety module 26' that constitutes additional electronic controls. Door-safety module 26' can be positioned between a motion sensor (not shown) (which can, for example, be a radar, infrared, ultrasonic or visible-light barrier), a programming switch (not shown) and a limit switch (not shown) on the one hand and the regular controls 25', the electromagnetic clutch 17' and signaling devices (not shown) on the other.

Other details relating to the conventional door arrangement, and controls associated therewith, described hereabove and illustrated in FIGS. 1a–1c, may be found in U.S. Pat. No. 5,127,190 to Hein et al., entitled "Sliding Door".

The disclosure now turns to a description of a control and regulation arrangement in accordance with at least one embodiment of the present invention. It will be understood that components discussed herebelow with reference to FIGS. 1–4 may, if appropriate, be considered to be interchangeable with similar components discussed hereinabove with relation to FIGS. 1a–1c.

FIG. 1 shows the basic coupling of the microprocessor control system 1 to safety-related branches, to the safety monitoring system 27 and its fault alarm unit 47, in connection with the watch dog timer 25. In general, it should be stated that this control and regulation concept is essentially independent of the type of door to be connected, and thus can be used on essentially all control and/or regulation systems of automatic doors.

The information from the various program modes 2, 5, 7 is preferably transmitted to the microprocessor control system 1 by means of connections 3, 4, 6 and 8. The status of the other safety-related equipment connected, such as the sensor 9, interlock 11, an additional sensor 13, the switch 15, and the safety stop 17 can also be reported to the microprocessor control system 1 by means of the connections 10, 12, 14, 16 and 18. For example, a particularly sensitive area of the program mode 2, in addition to the processing in the microprocessor control system 1, can also be forwarded to the safety monitoring system 27 by means of the connection 3. In this embodiment, the safety monitoring system 27 represents the double redundancy or double-channel arrangement, since, independently of the microprocessor control, the safety monitoring system 27, in connection with the fault alarm unit 47, is able to bring the connected motor to a stop.

Since the safety monitoring system 27 preferably has direct access to a potential blocking of the motor 33, the signal emitted by the motor via the connection 32 to the encoder 31 should also preferably be brought to the safety monitoring system 27 via the connection 29. Simultaneously, the encoder 31 is preferably connected to the microprocessor control system 1 via the connection 30. It is apparent that the signal regarding the direction of rotation and the speed of the motor is preferably transmitted both to the microprocessor control system 1 and to the safety monitoring system 27.

For example, if, as a result of a technical defect, the shutdown branch of the microprocessor control system is not operable, the fault alarm unit 47 is preferably addressed by the safety monitoring system 27 via the connection 28. This fault alarm unit 47 can also be made to respond, e.g. by the connector 42 of the relay 35, or depending on the circuit, even to fail, so that the contacts 37 interrupt the actuator 38 of the motor 33. Depending on the direct current motor 33 used, for example, the motor can operate on a braking resistance and/or can be directly short-circuited. Consequently, the connected door essentially comes to a stop immediately. In addition to the actuation of the relay 35, this signal is also preferably simultaneously forwarded to the microprocessor control 1 by the actuator 42 via the connection 43.

To safely guarantee the correct operation of the microprocessor control system 1, the system preferably sends a trigger signal 26 to a watch dog timer 25. This watch dog timer, for its part, preferably sends a reset signal 40 to the fault alarm unit 47. This also shows that the microprocessor control system 1 is designed with an increased level of safety in mind, because if the microprocessor control system 1 were not capable of bringing the motor 33 to a stop, e.g. in the event of a failure or malfunction, in this case the watch dog timer 25 would send a corresponding alarm to the fault alarm unit 47, and the fault alarm unit 47 would bring the motor 33 to a stop. If the motor 33 is brought to a stop by shutting off the bypass path, i.e. by means of the safety monitoring system 27, basically there has been a fault in the control system. That justifies a situation in which the door cannot be restarted automatically, but in which the entire system must be deliberately restarted by means of a manual reset-start 24. This reset-start 24 is preferably transmitted on one hand via the connection 23 to the microprocessor control system 1, and on the other hand via the connection 50 directly to the safety monitoring system 27, and here again, the double redundancy should preferably be achieved independently of the microprocessor control system 1.

However, in accordance with at least one preferred embodiment of the present invention, the fault alarm unit 47 should also preferably be tested by the microprocessor control system 1 via the connection 46. In this case, the relay 34 is preferably activated by means of the actuator 45. The return message that the relay 34 has been actuated is preferably sent to the microprocessor control system 1 via the connection 44. The relay 34, with its contacts 36, preferably interrupts the actuator 38 of the motor 33. Simultaneously with the actuation of the relay 34, the fault display 49 is preferably actuated via connection 48. In the fault display unit, either an acoustical signal and/or an optical display can be used to inform the maintenance or service personnel directly of which fault has occurred in the system.

In accordance with at least one preferred embodiment of the present invention, an additional safety device is provided in that there is a motor current monitoring system 65, by way of the connection 39 from the motor 33. The motor current monitoring system 65 preferably continuously sends its signals to the microprocessor control system 1 by means of the connection 41.

In addition to the various possible connections indicated above, the type of speed selected by means of the speed alarm 19 is available to the microprocessor control system 1 via the connection 20, and likewise, if the door in question is a revolving door, the rest position (X-position) 21 is preferably reported to the microprocessor control system 1 by means of the connection 22.

In addition to the automatic operation as described above, it is also possible to connect a service unit 66 to the microprocessor control system 1. The service unit 66 makes it possible, by means of additional manual switches, to test the double-redundant safety monitoring function of the entire system. However, for this purpose, it is desirable to have a program in the microprocessor control system 1 which prevents the braking of the door when it receives a stop signal from the sensors. For example, it is possible, that by means of the various switches, e.g. test stop 67, automatic 68, servo 69 and position 70 (see FIG. 4), various procedures, and thus also simultaneously safety functions, can be tested, to determine whether they are still within the tolerances specified by the manufacturer. As a result of this measure, it is possible to identify drifting of all sorts of values early on, and to make it possible for service personnel to take corresponding measures in the form of preventive maintenance in the control system, so that following test operation, the door will not fail or malfunction in normal operation.

Figure 4:
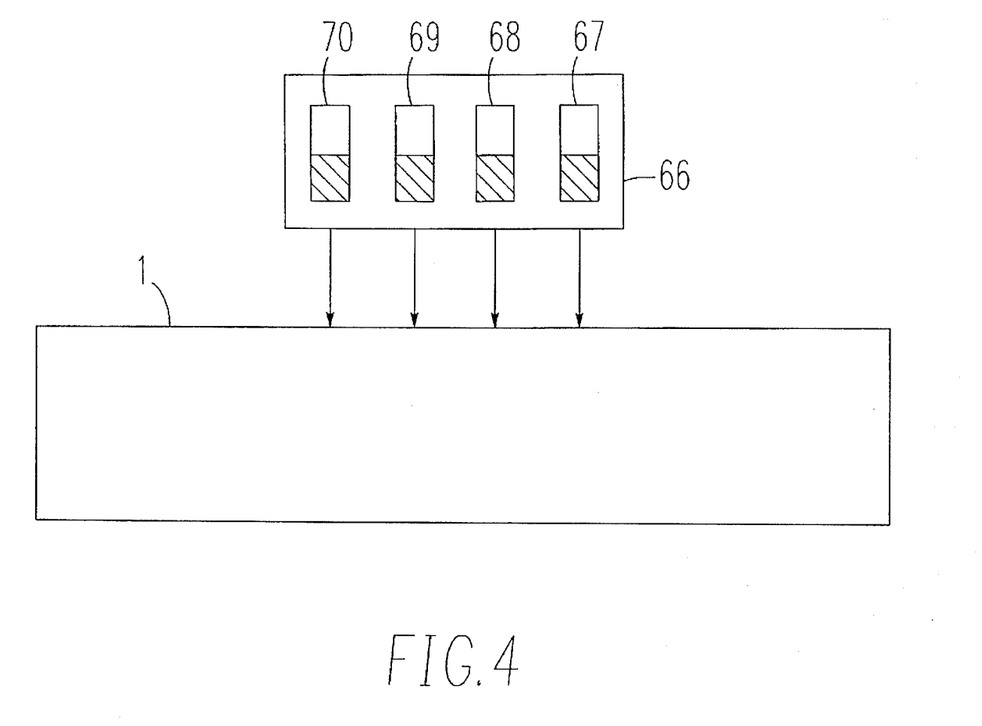
FIG. 4 is a service unit with microprocessor control.

Thus, in other words, in accordance with a preferred embodiment of the present invention, a service unit 66, which may alternatively be termed a "test unit" or "monitoring unit", may be provided to test the system, essentially by means of manual switches. The microprocessor 1 can be suitably programmed so as to prevent actual braking of the door in question when, for example, a "stop" signal is provided to the microprocessor 1 during testing. Service unit 66 is illustrated more particularly in FIG. 4, although the illustration in FIG. 4 is intended to be a non-restrictive example. Conceivably, then, in accordance with at least one preferred embodiment of the present invention, service unit 66 may include any types of switches that will permit service personnel to send appropriate signals to the microprocessor 1 so as to optimally test and monitor any desired functions of the door. The specific types of manual switches, circuitry and programming that would be suitable for these purposes would appear to be well within the purview of one of ordinary skill in the art, and will thus not be described in further detail herein.

Figure 2:
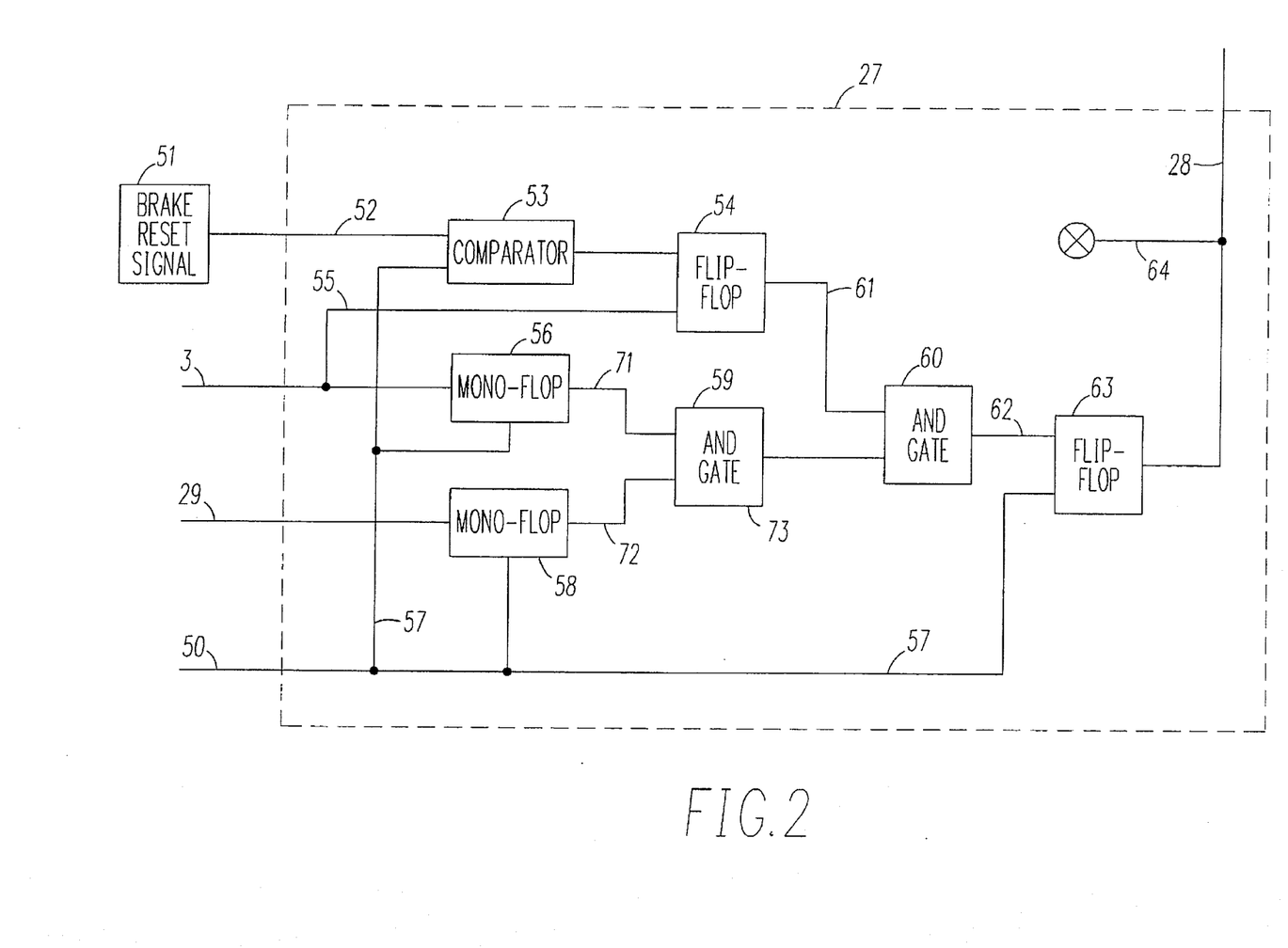
FIG. 2 illustrates a safety monitoring system.

FIG. 2 illustrates how the safety monitoring system 27 works in accordance with at least one preferred embodiment of the present invention. Starting from the microprocessor control system 1, after the door has been braked, a standard brake reset signal 51 can be sent in the normal manner via the connection 52 to the comparator 53. This comparator 53, in the event of a signal of "greater than or equal to 1", can set the RS flip-flop 54 by means of the reset input. The flip-flop 54 is thus activated, and when a stop signal is applied via the line 3, the flip-flop can be placed in connection with the connection 55 by means of its S-input. The RS flip-flop 54 can give a preparatory signal by means of the connection 61 to the AND gate 60. Thus, for example, an emergency stop is stored in memory. However, this stop signal can also be and simultaneously sent by means of the connection 3 to a mono-flop 56. The mono-flop 56 is thereby triggered, and generates a low signal for a specified length of time, preferably as a function of the stopping distance of the door. This time is the waiting time, during which the microprocessor control system 1 should have stopped the door under normal conditions.

After this length of time has passed, the mono-flop 56 preferably returns to 1 and transmits this information to the AND gate 59 via the connection 71. If the motor 33 does not come to a stop within the specified time, which is a function of the type of door connected, the encoder 31 (see FIG. 1) can continue to send its pulses to the mono-flop 58 by means of the connection 29. The output of the mono-flop 58 is also preferably sent to the AND gate 59 via the connection 72. If high signals are connected to both inputs of the AND gate 59, the output of the AND gate 59 is also switched to high, and forwards this information via the connection 73 to the next downstream AND gate 60.

Since, in this case, the door has not yet stopped, a high signal is still being applied via the connection 61 from the flip-flop 54 to the second input of the AND gate 60. Consequently, the output of the AND gate 60 is also occupied by a high signal, which sets the RS flip-flop 63 by means of the connection 62. The RS flip-flop 63 is thereby inverted and via the connection 28 reports a fault in the system to the fault alarm unit 47 (see FIG. 1), which then, for its part, as described above, brings the motor 33 (see FIG. 1) to a stop. At the same time, a fault is displayed 64 which indicates that the door has been brought to a stop by means of the safety monitoring system 27. The door can only be restarted by means of a reset-start 24 (see FIG. 1). This reset-start 24 is preferably transmitted via the connection 50 to the safety monitoring system 27, where, for its part, by means of the connections 57, it resets the mono-flops 56 and 58 and the RS flip-flop 63.

In such a case, if the microprocessor control system 1 is able to perform normal deceleration of the door, the comparator 53 is also preferably reset by means of the reset signal 51, and it is thereby possible to reactivate the flip-flop 54, in which the emergency stop is still stored, for repeated monitoring. As indicated above, the circuitry specified for the system can operate independently of the microprocessor control 1, as a double-redundancy, or double-channel, safety monitoring system.

Figure 3:
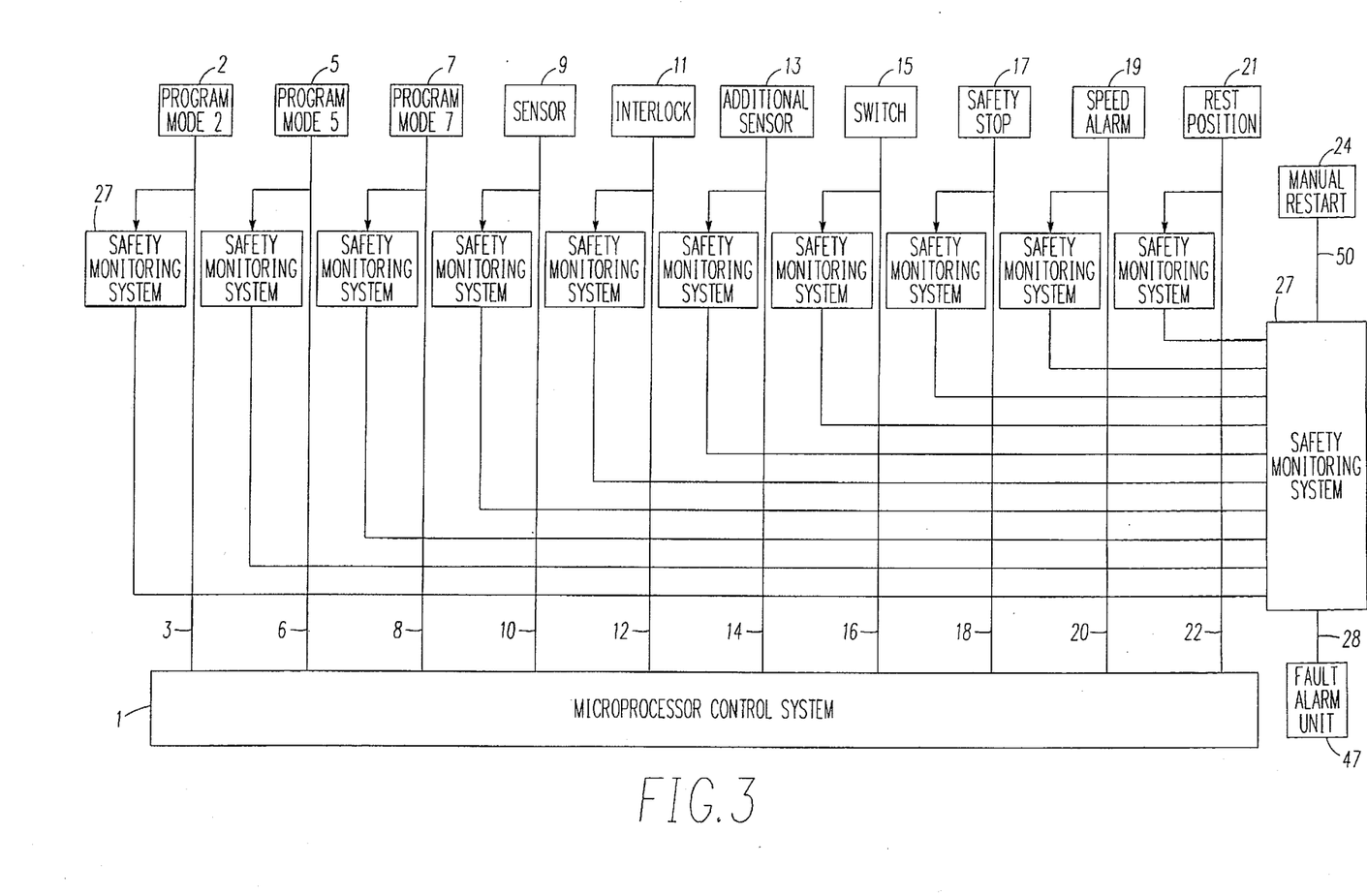
FIG. 3 is a schematic diagram of the circuitry of a safety concept with redundant safety measures.

The specified type of circuitry and thus a redundant embodiment can also be realized, as shown in FIG. 3, for all input signals 2, 5, 7, 9, 11, 13, 15, 17, 19 and 21, where on one hand the information is transmitted directly to the microprocessor control system 1, but on the other hand also directly to the safety monitoring system 27. In this case, the safety monitoring system 27 can function essentially exactly as described above, except that the circuit has been expanded correspondingly.

Therefore, by means of the switches (not all of which have been listed or discussed above) the flow of information can be interrupted, which can necessarily lead to the use of the second channel and thus to a simultaneous verification of the hardware and software. This safety check, by means of the manual switches, is preferably performed in a specified sequence.

With relation to FIG. 3, it is conceivable to provide a single safety monitoring system 27, to which all of the media 2, 5, 7, 9, 11, 13, 15, 17, 19 and 21 for providing input signals are connected, or multiple safety monitoring arrangements 27, each of which may be connected to a single one of the aforementioned input signal media. In the latter case, the multiple safety monitoring arrangements may be interconnected so as to function essentially as a single unit.

It should be understood that, in accordance with at least one preferred embodiment of the present invention, the safety monitoring system or systems 27 described heretofore, the microprocessor 1, and other basic components, as well as basic programs, program sequences or program steps associated therewith, may function analogously to similar components and program-related phenomena disclosed in U.S. Pat. No. 5,127,190 to Hein et al., entitled "Sliding Door".

Examples of "program modes" discussed heretofore should be generally well-known to those of ordinary skill in the art. They may include, for example, a "fast" program mode, a "slow" program mode and a "wind" program mode. This last program mode could correspond, for example, to the detection of a wind load on an external door.

It will be understood that the present invention can be applied, in accordance with at least one preferred embodiment, to sliding doors, revolving doors, swinging doors, and other types of doors that can be operated automatically.

One feature of the invention resides broadly in the control and regulation system for a door which is driven by an electric motor, and the movement of which is controlled by sensors, whereby the control and regulation unit contains a microprocessor provided for signal and command processing, characterized by the fact that the safety-related information and data, in addition to the processing in the microprocessor control system 1 are also transported to an additional safety monitoring system 27, where they are processed, and the output signal 28 of the safety monitoring system 27 is transported to a fault alarm unit 47 which by means of direct action on the motor 33 brings the motor to a stop, in addition to the direct actuation by the microprocessor control 1, and by the fact that a service unit 66 is connected to the microprocessor control system 1.

Another feature of the invention resides broadly in the control and regulation system characterized by the fact that the fault alarm unit 47 corresponds to a watch dog timer 25 triggered by the microprocessor control 1.

Yet another feature of the invention resides broadly in the control and regulation system characterized by the fact that in the event of a false triggering of the watch dog timer 25, the fault alarm unit 47 brings the motor 33 to a stop.

Still another feature of the invention resides broadly in the control and regulation system characterized by the fact that the safety monitoring system 27 and the microprocessor control system 1 are fed the signals from an encoder 31 of the motor 33.

A further feature of the invention resides broadly in the control and regulation system characterized by the fact that the motor current of the motor 33 is monitored by a motor current monitor 65 and the signal 41 is fed to the microprocessor control 1.

Another feature of the invention resides broadly in the control and regulation system characterized by the fact that when the motor 33 is shut down by means of the safety monitoring system 27, further operation of the door is only possible if a manual start command is given by means of the reset-start 24.

Yet another feature of the invention resides broadly in the control and regulation system characterized by the fact that in the event of the occurrence and recognition of a fault by the microprocessor control 1, this fault is displayed by the fault display 49 and leads to the shutdown of the motor 33.

Still another feature of the invention resides broadly in the control and regulation system characterized by the fact that in the event of the occurrence and detection of a fault by the safety monitoring system 27, this fault is displayed by means of the fault display 64 and leads to the shutdown of the motor 33.

A further feature of the invention resides broadly in the control and regulation system characterized by the fact that the safety monitoring system 27 is tested by the service unit 66.

Several U.S. Patents disclose types of automatic doors, and/or components associated therewith, as well as other conventional components, that may be utilized in accordance with the embodiments of the present invention. These are listed herebelow, with a brief indication as to their basic content.

For example, U.S. Pat. No. 4,697,383, which issued to Hagiwara on Oct. 6, 1987, discloses a controlling device for an automatic door.

U.S. Pat. No. 4,738,052, which issued to Yoshida on Apr. 19, 1988, discloses an automatic door with an automatic lock system.

U.S. Pat. No. 5,187,895, which issued to Huber on Feb. 23, 1993, discloses an automatic revolving door with sensors for detecting an individual.

U.S. Pat. No. 5,196,826, which issued to Whiting on Mar. 23, 1993, discloses sensors which may be utilized in accordance with the embodiments of the present invention.

U.S. Pat. No. 5,205,069, which issued to Shapiro on Apr. 27, 1993, discloses an automatic door assembly.

U.S. Pat. No. 5,247,763, which issued to Hein on Sep. 28, 1993, discloses an automatic sliding door.

Examples of controls, which may be utilized in accordance with the embodiments of the present invention, may be found in the following U.S. Patents: U.S. Pat. No. 4,375,019, which issued to Yoshida on Feb. 22, 1983; U.S. Pat. No. 5,226,256, which issued to Fries et al. on Jul. 17, 1993; U.S. Pat. No. 5,264,834, which issued to Silken et al. on Nov. 23, 1993; U.S. Pat. No. 5,323,151, which issued to Parsadayan on Jun. 21, 1994.

Examples of motor-encoder arrangements, which may be utilized in accordance with the embodiments of the present invention, may be found in the following U.S. Patents: U.S. Pat. No. 5,177,417, which issued to Lee et al. on Jan. 5, 1993; U.S. Pat. No. 5,192,903, which issued to Kita et al. on Mar. 9, 1993; U.S. Pat. No. 5,200,675, which issued to Woo on Apr. 6, 1993; U.S. Pat. No. 5,235,262, which issued to Takeuchi et al. on Aug. 10, 1993; and U.S. Pat. No. 5,339,727, which issued to Fessmann on Aug. 23, 1994.

Examples of watchdog timer arrangements, which may be utilized in accordance with the embodiments of the present invention, may be found in the following U.S. Patents: U.S. Pat. No. 5,226,152, which issued to Klug et al. on Jul. 6, 1993; U.S. Pat. No. 5,233,613, which issued to Allen et al. on Aug. 3, 1993; U.S. Pat. No. 5,244,350, which issued to Yang on Sep. 14, 1993.

Examples of flip-flop arrangements, which may be utilized in accordance with the embodiments of the present invention, may be found in the following U.S. Patents: U.S. Pat. No. 5,191,233, which issued to Nakano on Mar. 2, 1993; U.S. Pat. No. 5,208,487, which issued to Matsuura St al. on May 4, 1993; U.S. Pat. No. 5,334,917, which issued to Lind on Aug. 2, 1994; and U.S. Pat. No. 5,222,888, which issued to Jones et al. on Jun. 29, 1993.

Examples of monoflop arrangements, which may be utilized in accordance with the embodiments of the present invention, may be found in the following U.S. Patents: U.S. Pat. No. 5,086,395, which issued to Kirstein on Feb. 4, 1992; U.S. Pat. No. 4,651,234, which issued to Bauer on Mar. 17, 1987; and U.S. Pat. No. 4,746,820, which issued to Fey on May 24, 1988.

Examples of S-input arrangements, which may be utilized in accordance with the embodiments of the present invention, may be found in the following U.S. Patents: U.S. Pat. No. 5,233,638, which issued to Moriwaki et al. on Aug. 3, 1993; U.S. Pat. No. 4,904,858, which issued to LaMarche on Feb. 27, 1990; U.S. Pat. No. 4,661,831, which issued to Schmitt-Landsiedel on Apr. 28, 1987.

Examples of comparator arrangements, which may be utilized in accordance with the embodiments of the present invention, may be found in the following U.S. Patents: U.S. Pat. No. 5,182,500, which issued to Shimada on Jan. 26, 1993; U.S. Pat. No. 5,189,349, which issued to Haga on Feb. 23, 1993; U.S. Pat. No. 5,194,787, which issued to Antognini on Mar. 16, 1993; U.S. Pat. No. 5,204,606, which issued to Kuwahara et al. on Apr. 20, 1993.

Other examples of doors and controls, which may be utilized in accordance with the embodiments of the present invention, may be found in the following patent publications: U.S. Pat. No. 5,369,912, which issued to Ginzel et al. on Dec. 6, 1994; International Patent Application No. 93 18 444; Federal Republic of Germany Patent Application No. 41 31 396; European Patent Application No. 0 192 157 (corresponding to U.S. Pat. No. 4,733,343); and European Patent Application No. 0 264 350.

In brief recapitulation, it will be appreciated that the present invention, in accordance with at least one preferred embodiment, may relate to a control and regulation system for doors, which system is equipped with a microprocessor control. In addition to the normal path of data to the microprocessor control, a dual redundancy is achieved, in that there is a safety monitoring system which receives the same safety-related information as the microprocessor control. This safety monitoring system, for its part, is capable of detecting a fault, i.e. if the microprocessor control system has not shut off the door, the door is shut off by the safety monitoring system, which for its part reports any faults which occur in the system to a fault detection unit, and here again, by means of a redundant shutdown unit, brings the connected motor and thus the door to an immediate stop. In addition to the automatic verification of the safety-related functions, manual verification of the safety functions is also possible.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. P 43 40 715.2, filed on Nov. 30, 1993, and PCT/DE94/01316, filed on Nov. 2, 1994 having inventor Jürgen Stark, and DE-OS P 43 40 715.2 and DE-PS P 43 40 715.2 and International Application No. PCT/DE94/01316, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

| | Nomenclature |
|---|---|
| 10' | Door panel |
| 11' | Door panel |
| 12' | Springer |
| 13' | Belt drive mechanism |
| 14' | Cogwheel |
| 15' | Pulley |
| 16' | Motor |
| 17' | Magnetic clutch |
| 18' | Brackets |
| 19' | Brackets |
| 20' | Floor slides |
| 21' | Resilient structure |
| 22' | Stationary point |
| 23' | Pulleys |
| 24' | Locking mechanism |
| 25' | Controls |
| 26' | Door-safety module |
| 1 | Microprocessor control system |
| 2 | Program mode |
| 3 | Connection |
| 4 | Connection |
| 5 | Program mode |
| 6 | Connection |
| 7 | Program mode |
| 8 | Connection |
| 9 | Sensor |
| 10 | Connection |
| 11 | Interlock |
| 12 | Connection |
| 13 | Sensor |
| 14 | Connection |
| 15 | Switch |
| 16 | Connection |
| 17 | Emergency stop |
| 18 | Connection |
| 19 | Speed alarm |
| 20 | Connection |
| 21 | Rest position of the door |
| 22 | Connection |
| 23 | Connection |
| 24 | Reset-Start |
| 25 | Watch dog timer |
| 26 | Trigger signal |
| 27 | Safety monitoring system |
| 28 | Connection to fault alarm |
| 29 | Connection |
| 30 | Connection |
| 31 | Encoder |
| 32 | Connection |
| 33 | Motor |
| 34 | Relay |
| 35 | Relay |
| 36 | Contact |
| 37 | Contact |
| 38 | Motor actuator |

-continued

| | Nomenclature |
|---|---|
| 39 | Connection |
| 40 | Reset signal |
| 41 | Connection |
| 42 | Connection |
| 43 | Connection |
| 44 | Connection |
| 45 | Actuator |
| 46 | Connection |
| 47 | Fault alarm unit |
| 48 | Connection |
| 49 | Fault display |
| 50 | Connection |
| 51 | Reset signal brake |
| 52 | Connection |
| 53 | Comparator |
| 54 | RS flip-flop |
| 55 | Connection |
| 56 | Mono-flop |
| 59 | AND gate |
| 60 | AND gate |
| 61 | Connection |
| 62 | Connection |
| 63 | RS flip-flop |
| 64 | Fault display |
| 65 | Motor current monitoring system |
| 66 | Service unit |
| 67 | Test stop |
| 68 | Automatic control |
| 69 | Servo |
| 70 | Position |
| 71 | Connection |
| 72 | Connection |
| 73 | Connection |

What is claimed is:

1. An automatic door for a building, said automatic door comprising:

door means;

means for opening and closing said door means;

means for operating said door opening and closing means;

sensor means for producing operating signals to control the operation of said door opening and closing means;

said sensor means comprising means for determining an unsafe operating condition of said automatic door;

said means for determining an unsafe operating condition comprising means for producing safety-related signals;

electronic controller means for controlling the operation of said door opening and closing means;

means for providing the operating signals to said electronic controller means;

means for providing the safety-related signals to said electronic controller means;

said electronic controller means comprising means for operating said door opening and closing means in response to the operating signals;

said electronic controller means comprising first means for de-activating said door opening and closing means;

said first means for de-activating said door opening and closing means comprising means for de-activating said door opening and closing means in response to the safety-related signals;

second means for de-activating said door opening and closing means;

said second means for de-activating said door opening and closing means comprising a safety monitoring system;

means for providing the safety-related signals to said safety monitoring system;

said safety monitoring system comprising means for evaluating the safety-related signals based on predetermined parameters;

said evaluating means comprising means for determining a fault condition; and said second means for de-activating said door opening and closing means comprising means for de-activating said door opening and closing means in response to a fault condition.

2. The automatic door according to claim 1, further comprising:

said safety monitoring system comprising means for producing an output signal in response to said evaluating means determining a fault condition;

said second means for de-activating said door opening and closing means comprising a fault alarm unit;

means for providing the output signal of said safety monitoring system to said fault alarm unit;

said fault alarm unit comprising means for de-activating said door opening and closing means in response to the output signal; and said fault alarm unit comprising means for de-activating said door opening and closing means independently of said first means for de-activating said door opening and closing means.

3. The automatic door according to claim 2, further comprising:

means for testing said fault alarm unit;

said means for testing said fault alarm unit comprising:
relay means;
said relay means comprising means for being actuated by an input signal;
said relay means comprising means for generating an actuation signal upon actuation of said relay means;
said electronic controller means comprising means for generating a first actuator signal;
means for providing the first actuator signal to said fault alarm unit;
said fault alarm unit comprising means for generating a second actuator signal in response to the first actuator signal;
means for providing the second actuator signal to said relay means;
said second actuator signal comprising the input signal to said relay means; end
means for providing the actuation signal of said relay means to said electronic controller means, for verifying operation of said fault alarm unit.

4. The automatic door according to claim 2, further comprising:

means for testing the operation of said automatic door;

said testing means comprising means for testing said first means for de-activating said door opening and closing means;

said testing means comprising a service unit;

said service unit comprising means for generating test signals for simulating the safety-related signals;

said service unit comprising means for generating test signals for simulating the operating signals; and said testing means comprising means for supplying the test signals to said electronic controller means.

5. The automatic door according to claim 4, further comprising:

means for monitoring operation of said electronic controller means;

said monitoring means comprising watch dog timer means;

said watch dog timer means comprising means for generating an alarm signal upon expiration of a predetermined amount of time;

said watch dog timer means comprising means for resetting said watch dog timer means in response to a trigger signal;

said electronic controller means comprising means for producing the trigger signal within the predetermined amount of time; and means for communicating the trigger signal to said watch dog timer means.

6. The automatic door according to claim 4, further comprising:

said door opening and closing means comprising motor means for opening and closing said door means;

means for monitoring operation of said motor means;

said motor monitoring means comprising encoder means;

said encoder means comprising means for generating motor signals;

means for providing the motor signals to said electronic controller means;

said first means for de-activating said door opening and closing means comprising means for de-activating said door opening and closing means in response to the motor signals provided said electronic controller means;

means for transmitting the motor signals to said safety monitoring system; and said evaluating means of said safety monitoring system comprising means for evaluating said motor signals to determine a fault condition.

7. The automatic door according to claim 4, further comprising:

said door opening and closing means comprising electric motor means for opening and closing said door means;

said electric motor means comprising motor current;

means for monitoring the motor current of said electric motor means;

said means for monitoring the motor current comprising means for generating motor current signals;

means for transmitting the motor current signals to said electronic controller means; and said first means for de-activating said door opening and closing means comprising means for de-activating said door opening and closing means in response to the motor current signals transmitted to said electronic controller means.

8. The automatic door according to claim 4, further comprising:

said means for testing the operation of said automatic door comprising means for testing said second means for de-activating said door opening and closing means; and said means for testing said second means for de-activating said door opening and closing means comprising means for disabling said first means for de-activating said door opening and closing means.

9. The automatic door according to claim 5, further comprising:

said second means for de-activating said door opening and closing means comprising means for de-activating said door opening and closing means in response to the alarm signal; and said means for de-activating said door opening and closing means in response to the alarm signal comprising:
said fault alarm unit;
means for communicating the alarm signal to said fault alarm unit; and
said fault alarm unit comprising means for de-activating said door opening and closing means in response to the alarm signal.

10. The automatic door according to claim 9, further comprising:
means for manually restarting said door opening and closing means;
means for requiring a manual restart of said door opening and closing means upon de-activation of said door opening and closing means by said second means for de-activating said door opening and closing means;
said manual restart means comprising means for generating a reset-start signal;
means for providing the reset-start signal to said electronic controller means;
means for providing the reset-start signal to said safety monitoring system; and
said means for providing the reset-start signal to said safety monitoring system comprising means for resetting said evaluating means of said safety monitoring system.

11. The automatic door according to claim 10, further comprising:
said electronic controller means comprising:
means for evaluating signals transmitted to said electronic controller means to determine a fault condition;
means for generating a fault signal in response to said electronic controller evaluation means determining a fault condition; and
said first means for de-activating said door opening and closing means comprising means for de-activating said door opening and closing means in response to a fault condition;
a fault display;
said fault display means comprising means for informing service personnel of a fault condition as determined by said electronic controller means; and
means for providing the fault signal to said fault display.

12. The automatic door according to claim 10, wherein:
said safety monitoring system comprises safety monitoring fault display means;
means for providing the output signal to said safety monitoring fault display means; and
said safety monitoring fault display means comprises means for informing service personnel of a fault condition as determined by said safety monitoring system evaluation means.

13. A safety controller for an automatic door, which automatic door comprises door means; means for opening and closing the door means; sensor means for producing operating signals to control the operation of the door opening and closing means; the sensor means comprising means for determining an unsafe operating condition of said automatic door; the means for determining an unsafe operating system comprising means for producing safety-related signals; electronic controller means for controlling the operation of the door opening and closing means; means for providing the operating signals to the electronic controller means; the electronic controller means comprising means for operating the door opening and closing means in response to the operating signals; the electronic controller means comprising first means for de-activating the door opening and closing means; the first means for de-activating the door opening and closing means comprising means for de-activating the door opening and closing means in response to the safety-related signals;
said safety controller comprising:
a safety monitoring system;
means for providing the safety-related signals to said safety monitoring system;
said safety monitoring system comprising means for evaluating signals based on predetermined parameters;
said evaluating means comprising means for determining a fault condition;
said evaluating means comprising means for evaluating the safety-related signals; and
second means for de-activating the door opening and closing means in response to a fault condition.

14. The safety controller according to claim 13, said safety controller further comprising:
a fault alarm unit;
means for communicating a fault condition to said fault alarm unit from said safety monitoring system;
said second means for de-activating the door opening and closing means comprising said fault alarm unit; and
said fault alarm unit comprising means for de-activating the door opening and closing means in response to a fault condition.

15. The safety controller according to claim 14, said safety controller further comprising:
watch dog timer means;
said watch dog timer means comprising means for generating an alarm signal upon expiration of a predetermined amount of time;
said watch dog timer means comprising means for resetting said watch dog timer means in response to a trigger signal;
the electronic controller means comprising means for producing the trigger signal within the predetermined amount of time;
means for communicating the trigger signal to said watch dog timer means;
said second means for de-activating said door opening and closing means comprising means for de-activating said door opening and closing means in response to the alarm signal; and
said means for de-activating said door opening and closing means in response to the alarm signal comprising:
said fault alarm unit;
means for communicating the alarm signal to said fault alarm unit; and
said fault alarm unit comprising means for de-activating said door opening and closing means in response to the alarm signal.

16. The safety controller according to claim 15, further comprising:
means for manually restarting said door opening and closing means;
means for requiring a manual restart of said door opening and closing means upon de-activation of said door opening and closing means by said second means for de-activating said door opening and closing means;

said manual restart means comprising means for generating a reset-start signal;

means for providing the reset-start signal to said electronic controller means;

means for providing the reset-start signal to said safety monitoring system; and said means for providing the reset-start signal to said safety monitoring system comprising means for resetting said evaluating means of said safety monitoring system.

17. An automatic door for a building, said automatic door comprising:

door means;

means for opening and closing said door means;

means for operating said door opening and closing means;

sensor means for producing operating signals to control the operation of said door opening and closing means;

said sensor means comprising means for determining an unsafe operating condition of said automatic door;

said means for determining an unsafe operating condition comprising means for producing safety-related signals;

electronic regulator means for controlling the operation of said door opening and closing means;

means for providing the operating signals to said electronic regulator means;

means for providing the safety-related signals to said electronic regulator means;

said electronic regulator means comprising means for operating said door opening and closing means in response to the operating signals;

said electronic regulator means comprising first means for de-activating said door opening and closing means;

said first means for de-activating said door opening and closing means comprising means for de-activating said door opening and closing means in response to the safety-related signals;

second means for de-activating said door opening and closing means;

said second means for de-activating said door opening and closing means comprising a safety monitoring system;

means for providing the safety-related signals to said safety monitoring system;

said safety monitoring system comprising means for evaluating the safety-related signals based on predetermined parameters;

said evaluating means comprising means for determining a fault condition;

said second means for de-activating said door opening and closing means comprising means for de-activating said door opening and closing means in response to a fault condition;

said safety monitoring system comprising means for producing an output signal in response to said evaluating means determining a fault condition;

a fault alarm unit;

said second means for de-activating said door opening and closing means comprising said fault alarm unit;

means for providing the output signal of said safety monitoring system to said fault alarm unit;

said fault alarm unit comprising means for de-activating said door opening and closing means in response to the output signal;

said fault alarm unit comprising means for de-activating said door opening and closing means independently of said first means for de-activating said door opening and closing means;

means for testing the operation of said automatic door;

said testing means comprising means for testing said first means for de-activating said door opening and closing means;

said testing means comprising a service unit;

said service unit comprising means for generating test signals for simulating the safety-related signals;

said service unit comprising means for generating test signals for simulating the operating signals; and said testing means comprising means for supplying the test signals to said electronic regulator means.

18. The automatic door according to claim 17, said automatic door further comprising:

means for monitoring operation of said electronic regulator means;

said monitoring means comprising watch dog timer means;

said watch dog timer means comprising means for generating an alarm signal upon expiration of a predetermined amount of time;

said watch dog timer means comprising means for resetting said watch dog timer means in response to a trigger signal;

said electronic regulator means comprising means for producing the trigger signal within the predetermined amount of time;

means for communicating the trigger signal to said watch dog timer means;

said second means for de-activating said door opening and closing means comprising means for de-activating said door opening and closing means in response to the alarm signal; and said means for de-activating said door opening and closing means in response to the alarm signal comprising:
said fault alarm unit;
means for communicating the alarm signal to said fault alarm unit; and
said fault alarm unit comprising means for de-activating said door opening and closing means in response to the alarm signal.

19. The automatic door according to claim 18, further comprising:

means for manually restarting said door opening and closing means;

means for requiring a manual restart of said door opening and closing means upon de-activation of said door opening and closing means by said second means for de-activating said door opening and closing means;

said manual restart means comprising means for generating a reset-start signal;

means for providing the reset-start signal to said electronic regulator means;

means for providing the reset-start signal to said safety monitoring system; and said means for providing the reset-start signal to said safety monitoring system comprising means for resetting said evaluating means of said safety monitoring system.

20. The automatic door according to claim 19, further comprising:

said electronic regulator means comprising:

means for evaluating signals transmitted to said electronic regulator means to determine a fault condition;

means for generating a fault signal in response to said electronic regulator evaluation means determining a fault condition; and said first means for de-activating said door opening and closing means comprising means for de-activating said door opening and closing means in response to a fault condition determined by said electronic regulator means to determine a fault condition;

a fault display;

said fault display means comprising means for informing service personnel of a fault condition as determined by said electronic regulator evaluation means;

means for providing the fault signal to said fault display;

said safety monitoring system further comprising a safety monitoring fault display means;

means for providing the output signal to said safety monitoring fault display means; and said safety monitoring fault display means comprising means for informing service personnel of a fault condition as determined by said safety monitoring system evaluation means.

* * * * *

UNITED STATES PATENT AND TRADEMARK OFFICE
CERTIFICATE OF CORRECTION

PATENT NO. : 5,625,266
DATED : April 29, 1997
INVENTOR(S) : Jürgen STARK

It is certified that error appears in the above-identified patent and that said Letters Patent is hereby corrected as shown below:

On the title page, item [30], after 'Germany', delete "43 40 715.2" and insert --43 40 715.3--.

In column 13, line 46, Claim 3, after 'means;', delete "end" and insert --and--.

Signed and Sealed this

Twenty-ninth Day of July, 1997

Attest:

BRUCE LEHMAN

Attesting Officer

Commissioner of Patents and Trademarks